United States Patent
Yamauchi

(10) Patent No.: US 8,098,327 B2
(45) Date of Patent: Jan. 17, 2012

(54) MOVING IMAGE FRAME RATE CONVERTING APPARATUS AND MOVING IMAGE FRAME RATE CONVERTING METHOD

(75) Inventor: Himio Yamauchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1254 days.

(21) Appl. No.: 11/808,473

(22) Filed: Jun. 11, 2007

(65) Prior Publication Data

US 2008/0002052 A1    Jan. 3, 2008

(30) Foreign Application Priority Data

Jun. 30, 2006   (JP) .................................. 2006-182511

(51) Int. Cl.
*H04N 7/01* (2006.01)

(52) U.S. Cl. ........................................................ 348/441

(58) Field of Classification Search .................. 348/441, 348/448, 554, 552, 458, 459, 725
See application file for complete search history.

(56) References Cited

U.S. PATENT DOCUMENTS

| | | | | |
|---|---|---|---|---|
| 6,118,486 A * | 9/2000 | Reitmeier | ...................... | 348/441 |
| 7,202,911 B2 * | 4/2007 | Brelay | ........................... | 348/561 |
| 7,237,903 B2 * | 7/2007 | Nagayoshi | ...................... | 353/30 |
| 7,400,459 B2 * | 7/2008 | Welch | ........................... | 359/802 |
| 2005/0134735 A1* | 6/2005 | Swartz | ........................... | 348/554 |
| 2008/0151108 A1* | 6/2008 | Doswald | ....................... | 348/456 |
| 2009/0262263 A1* | 10/2009 | Miller | ........................... | 348/805 |

FOREIGN PATENT DOCUMENTS

JP    2000-134585    5/2000

\* cited by examiner

*Primary Examiner* — Paulos Natnael
(74) *Attorney, Agent, or Firm* — Pillsbury Winthrop Shaw Pittman, LLP

(57) ABSTRACT

According to one embodiment, when an input image signal is to be enlarged, a moving image frame rate converting apparatus performs, by a first image processing device for performing scaling and color format conversion on the input image signal before frame rate conversion, the color format conversion without performing the scaling, and performs, by a second image processing device for performing scaling on a post-conversion image signal after the frame rate conversion, the scaling so as to generate an output image signal.

12 Claims, 6 Drawing Sheets

MOVING IMAGE FRAME RATE CONVERTING APPARATUS AND MOVING IMAGE FRAME RATE CONVERTING METHOD

CROSS-REFERENCE TO RELATED APPLICATIONS

This application is based upon and claims the benefit of priority from Japanese Patent Application No. 2006-182511, filed Jun. 30, 2006, the entire contents of which are incorporated herein by reference.

BACKGROUND

1. Field

One embodiment of the invention relates to a moving image frame rate converting apparatus for performing frame rate conversion, and a moving image frame rate converting method.

2. Description of the Related Art

As display schemes for displaying images which are currently in practical use, there exists a great variety of display schemes such as NTSC (National Television System Committee), PAL (Phase Alternation by Line color television), Hi-Vision, and ones for personal computers for example.

Further, when various input image signals for different display schemes are inputted to a display apparatus such as a liquid crystal display or a plasma display to display images, it is necessary to perform frame rate conversion to convert the frame rate of an input image signal to a frame rate that is unique to the display apparatus.

Conventionally, regarding an apparatus for performing the frame rate conversion (frame rate converting apparatus), there have been made various proposals. For example, in Japanese Patent Application Publication (KOKAI) No. 2000-134585 (Patent document 1), there is disclosed an apparatus for performing frame rate conversion of motion compensation type, which detects a motion vector of an image and moves image positions of previous/subsequent frames by this motion vector so as to generate an interpolation frame, in order to avoid deterioration in image quality of a moving image.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, when an input image signal is to be enlarged, a moving image frame rate converting apparatus performs, by a first image processing device for performing scaling and color format conversion on the input image signal before frame rate conversion, the color format conversion without performing the scaling, and performs, by a second image processing device for performing scaling on a post-conversion image signal after the frame rate conversion, the scaling so as to generate an output image signal.

(Configuration of Moving Image Frame Rate Converting Apparatus)

Figure 1:
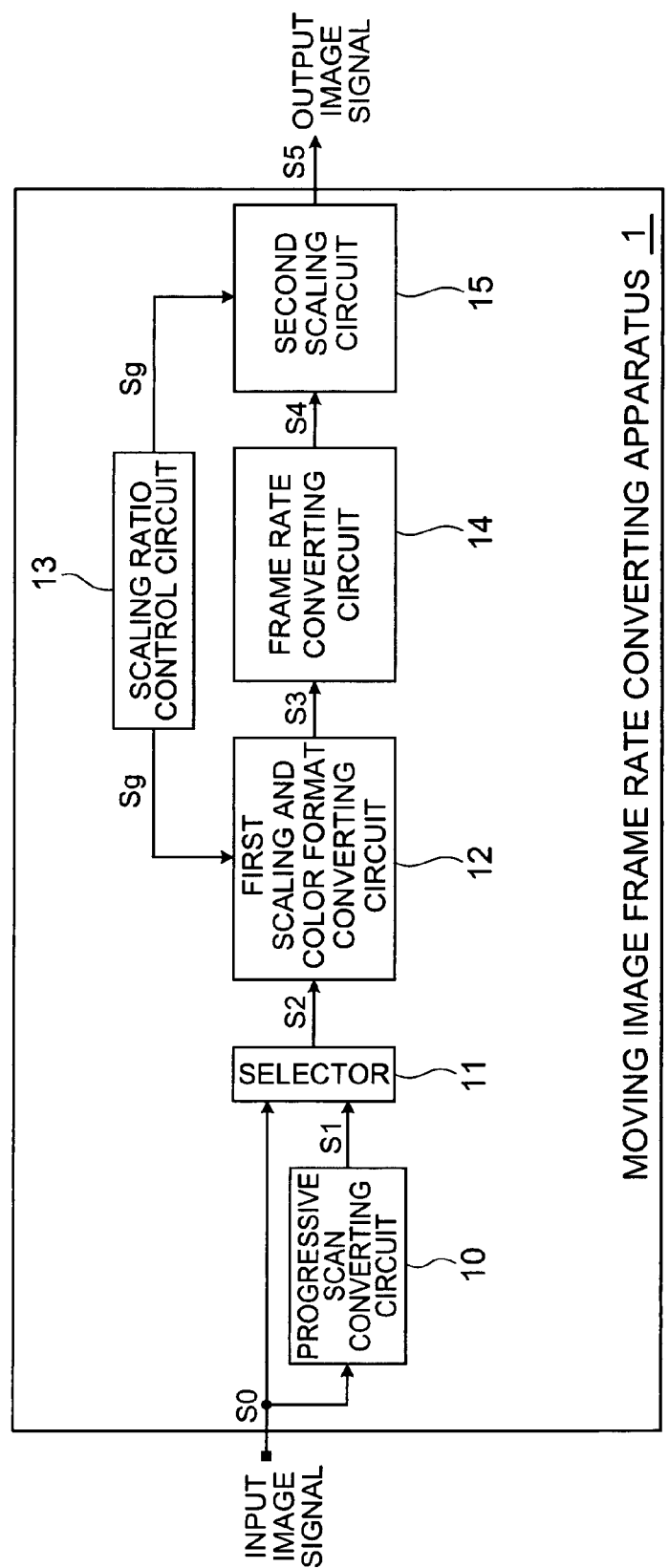
FIG. 1 is an exemplary block diagram showing a configuration of a moving image frame rate converting apparatus according to an embodiment of the invention.

FIG. 1 is a block diagram showing a configuration of a moving image frame rate converting apparatus 1 according to an embodiment of the invention. This moving image frame rate converting apparatus 1 is configured to perform frame rate conversion by motion compensation on an input image signal S0, and generates and outputs an output image signal S5.

The moving image frame rate converting apparatus 1 has a progressive scan converting circuit 10, a selector 11, and a first scaling and color format converting circuit 12. Further, the moving image frame rate converting apparatus 1 has a scaling ratio control circuit 13, a frame rate converting circuit 14, and a second scaling circuit 15.

When the input image signal S0 is an image signal of interlace scanning scheme (hereinafter referred to as "interlace scanning signal"), the progressive scan converting circuit 10 converts the input image signal S0 to an image signal S1 of progressive scanning scheme (hereinafter referred to as "progressive scanning signal") and outputs it. The selector 11 selects either the input image signal S0 or the progressive scanning signal S1 and outputs a selection signal S2.

Here, in the moving image frame rate converting apparatus 1 according to this embodiment, a progressive scanning signal or an interlace scanning signal is inputted as the input image signal S0. As the input image signal S0, a signal having a format with different sampling rates for a luminance signal and a color signal, such as having a color format of YCbCr4:2:0 format, YCbCr4:2:2 format, YCbCr4:4:4 format, or the like is also included.

Then, when the input image signal S0 is the interlace scanning signal, the progressive scan converting circuit 10 converts the input image signal S0 to a progressive scanning signal S1, and the selector 11 selects the progressive scanning signal S1 as the selection signal S2. Further, when the input image signal S0 is the progressive scanning signal, the selector 11 selects the input image signal S0 as the selection signal S2.

In this manner, the progressive scanning signal is inputted as the selection signal S2 to the first scaling and color format converting circuit 12.

Next, the first scaling and color format converting circuit 12, which is a first image processing device, performs on the selection signal S2 scaling for changing an image size by conversion of the number of pixels in a horizontal or vertical direction, as well as color format conversion. The color format conversion means to perform scaling of colors for conversion of YCbCr4:2:0, YCbCr4:2:2, YCbCr4:4:4 from one to the other. Accordingly, as shown in FIG. 1, in the first scaling and color format converting circuit 12, a scaling device performing scaling on the selection signal S2 and a color format converting device performing the color format conversion are constructed as one block.

The first scaling and color format converting circuit 12 operates according to a control signal outputted from the scaling ratio control circuit 13, and outputs a pre-conversion image signal S3. Specific operation contents of this first scaling and color format converting circuit 12 will be described in detail later.

The scaling ratio control circuit 13 has a CPU, a ROM, and a RAM, and the CPU operates while reading/writing data to/from the RAM according to a control program stored in the ROM. Then, the scaling ratio control circuit 13 outputs a control signal sg to the first scaling and color format converting circuit 12 and the second scaling circuit 15. This scaling ratio control circuit 13 has a function as a judging unit for judging whether the input image signal S0 is to be enlarged or not.

The frame rate converting circuit 14 performs the frame rate conversion by motion compensation on the pre-conversion image signal S3 to generate a post-conversion image signal S4 after the frame rate conversion, and outputs it to the second scaling circuit 15. The specific configuration of the frame rate converting circuit 14 will also be described in detail later.

Figure 6:
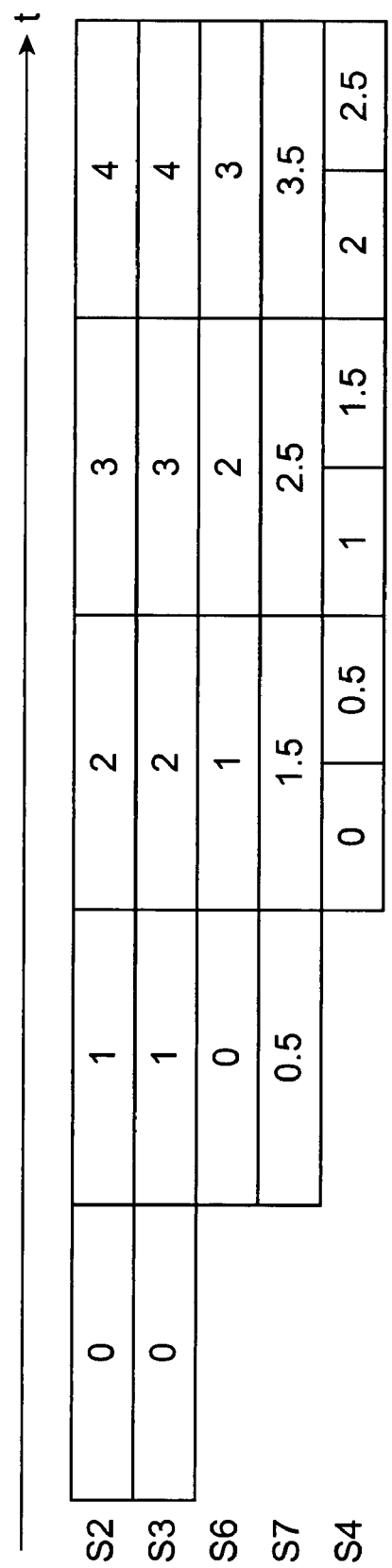
FIG. 6 is an exemplary chart showing an example of timing of respective signals, a selection signal, a pre-conversion image signal, a post-conversion image signal, and a frame delay signal and an interpolation frame in the embodiment.

The second scaling circuit 15, which is a second image processing device according to the invention, performs the scaling to change an image size by conversion of the number of pixels in a horizontal or vertical direction, and so forth on the post-conversion image signal S4 so as to generate and output an output image signal S5. The second scaling circuit 15 operates according to the control signal sg outputted from the scaling ratio control circuit 13 to output the output image signal S5. Specific operation contents of the second scaling circuit 15 will be described in detail later. Note that FIG. 6 shows an example of timing of respective signals, the selection signal S2, the pre-conversion image signal S3, the post-conversion image signal S4, and a frame delay signal S6 and an interpolation frame S7 which will be described later.

(First Operation Contents of the Moving Image Frame Rate Converting Apparatus)

Next, operation contents of the moving image frame rate converting apparatus 1 having the configuration as above will be described in accordance with the flowchart shown in FIG. 3. Note that in FIG. 3 and in FIG. 4 which will be described later, block is abbreviated to "S".

Figure 3:
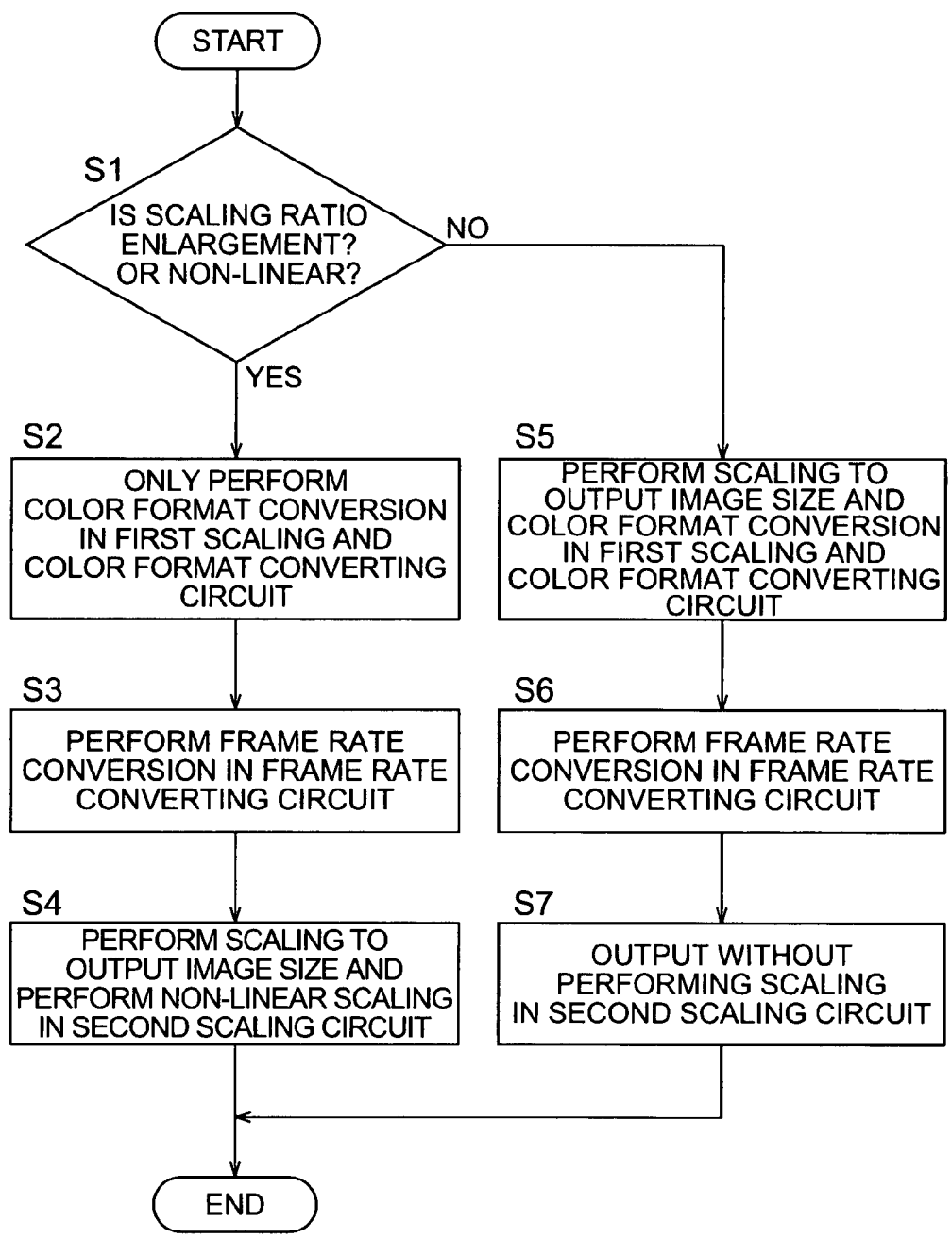
FIG. 3 is an exemplary flowchart showing an operation procedure of frame rate conversion processing by the moving image frame rate converting apparatus in the embodiment.
Figure 4:
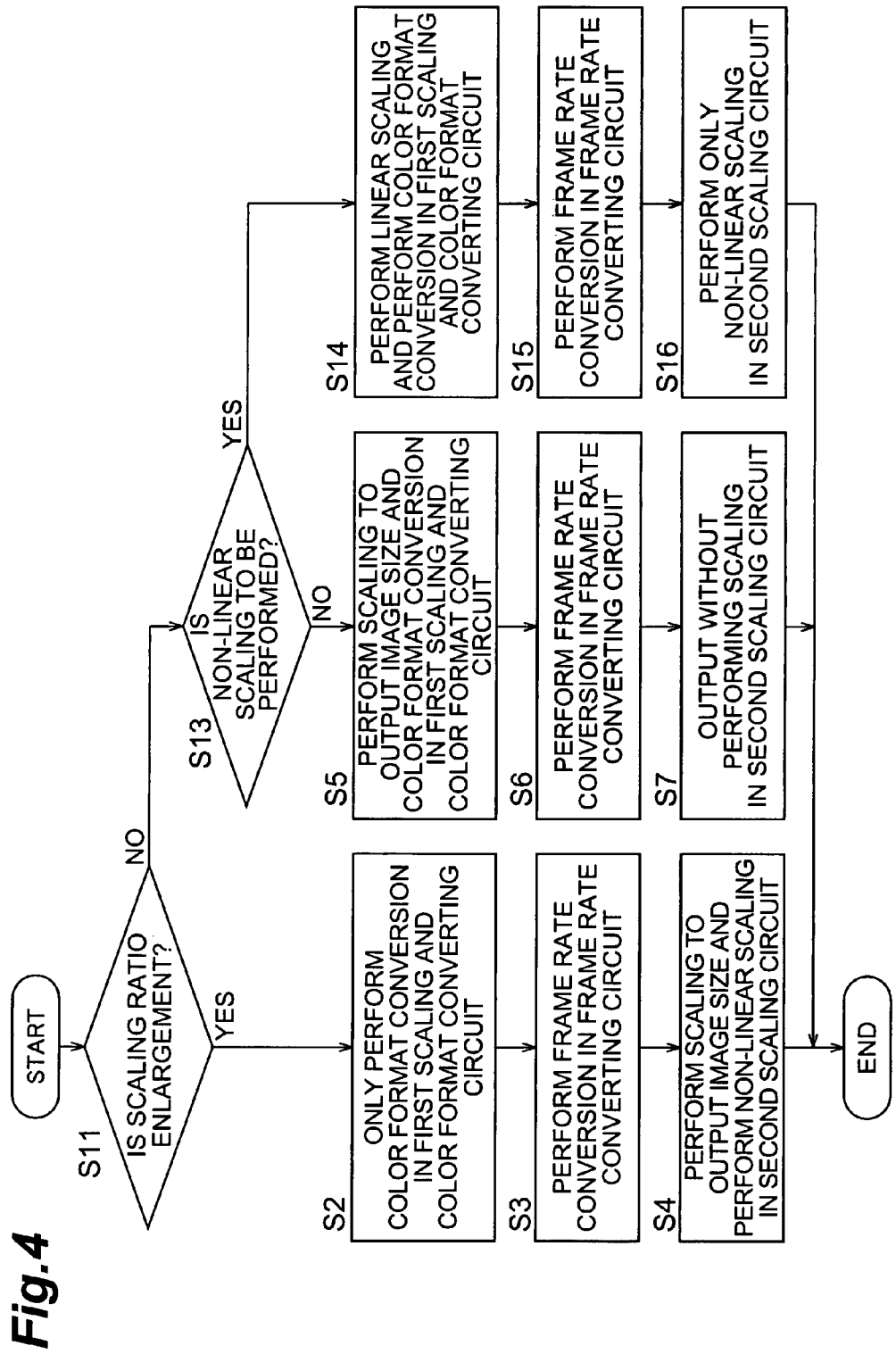
FIG. 4 is an exemplary flowchart showing another operation procedure of frame rate conversion processing by the moving image frame rate converting apparatus in the embodiment.

FIG. 3, FIG. 4 are flowcharts showing operation procedures of frame rate conversion processing by the moving image frame rate converting apparatus 1. First, in accordance with FIG. 3, an operation procedure of frame rate conversion processing will be described.

When starting the frame rate conversion processing, the moving image frame rate converting apparatus 1 proceeds to block 1, and the scaling ratio control circuit 13 judges whether the scaling ratio is enlargement (namely, the image size of the input image signal S0 is to be enlarged) or non-linear scaling is to be performed or not.

At this time, the scaling ratio control circuit 13 performs an operation as the judging unit, and judges whether or not the image size of the output image signal S5 is larger than the image size of the selection signal S2 as a progressive scanning signal, and when the former is larger than the latter, it judges that enlargement of the image size is to be performed and executes processing of block 2. Also when the non-linear scaling is to be performed, the scaling ratio control circuit 13 executes the processing of block 2.

Meanwhile, the scaling ratio control circuit 13 executes processing of block 5 when it judges that the image size is not to be enlarged, specifically, when the image size of the input image signal S0 is equal to or larger than the image size of the output image signal S5 (case of reduced or equal scale), as well as when the non-linear scaling is not to be performed.

When executing the processing of block 2, the scaling ratio control circuit 13 performs an operation as a control unit, and outputs to the first scaling and color format converting circuit 12 a control signal sg for instructing to perform only the color format conversion and not to perform enlargement (scaling) of an image size.

Then, the first scaling and color format converting circuit 12 performs only the color format conversion, which equalizes sampling intervals for a luminance signal and a color signal, and the pre-conversion image signal S3 is outputted without enlargement of the image size thereof. In this case, for example, when the color format of the selection signal S2 as a progressive scanning signal is the YCbCr4:2:0 format, only color format conversion to the YCbCr4:4:4 format is performed, and the image size is not enlarged.

Further, when the processing of block 2 is executed and the pre-conversion image signal S3 is outputted, processing of block 3 is executed. At this time, the frame rate conversion circuit 14 operates to perform the frame rate conversion by motion compensation on the pre-conversion image signal S3, and generate and output the post-conversion image signal S4.

Further, when the post-conversion image signal S4 is generated, processing of block 4 is executed. Here, the scaling ratio control circuit 13 performs an operation as the control unit, and outputs to the second scaling circuit 15 a control signal sg for instructing to perform scaling on the post-conversion image signal S4. Then, the second scaling circuit 15 performs conversion of the number of pixels in a horizontal or vertical direction for enlarging to the image size of the output image signal S5, and so forth on the post-conversion image signal S4, and generates and outputs the output image signal S5. Further, when the non-linear scaling is to be performed, the second scaling circuit 15 performs the non-linear scaling, and generates and outputs the output image signal S5. When block 4 is finished, the frame rate conversion processing is completed.

On the other hand, the scaling ratio control circuit 13 performs an operation as the control unit also when executing the processing of block 5. In this case, the scaling ratio control circuit 13 outputs to the first scaling and color format converting circuit 12 a control signal sg for instructing to perform color format conversion as well as scaling of an image size (reduced or equal scale in this case).

Then, by the first scaling and color format converting circuit 12, color format conversion similar to block 2 and the scaling are performed, and then the pre-conversion image signal S3 is outputted.

Further, when the pre-conversion image signal S3 is outputted by executing the processing of block 5, processing of block 6 is executed similarly to block 3, and then the post-conversion image signal S4 is generated and outputted.

Subsequently, when the post-conversion image signal S4 is outputted, processing of block 7 is executed. Here, the scaling ratio control circuit 13 performs an operation as the control unit, and outputs a control signal sg to the second scaling circuit 15 for instructing to generate the output image signal S5 without performing scaling on the post-conversion image signal S4. Then, the second scaling circuit 15 generates and outputs the output image signal S5 without performing the scaling on the post-conversion image signal S4.

Figure 5:
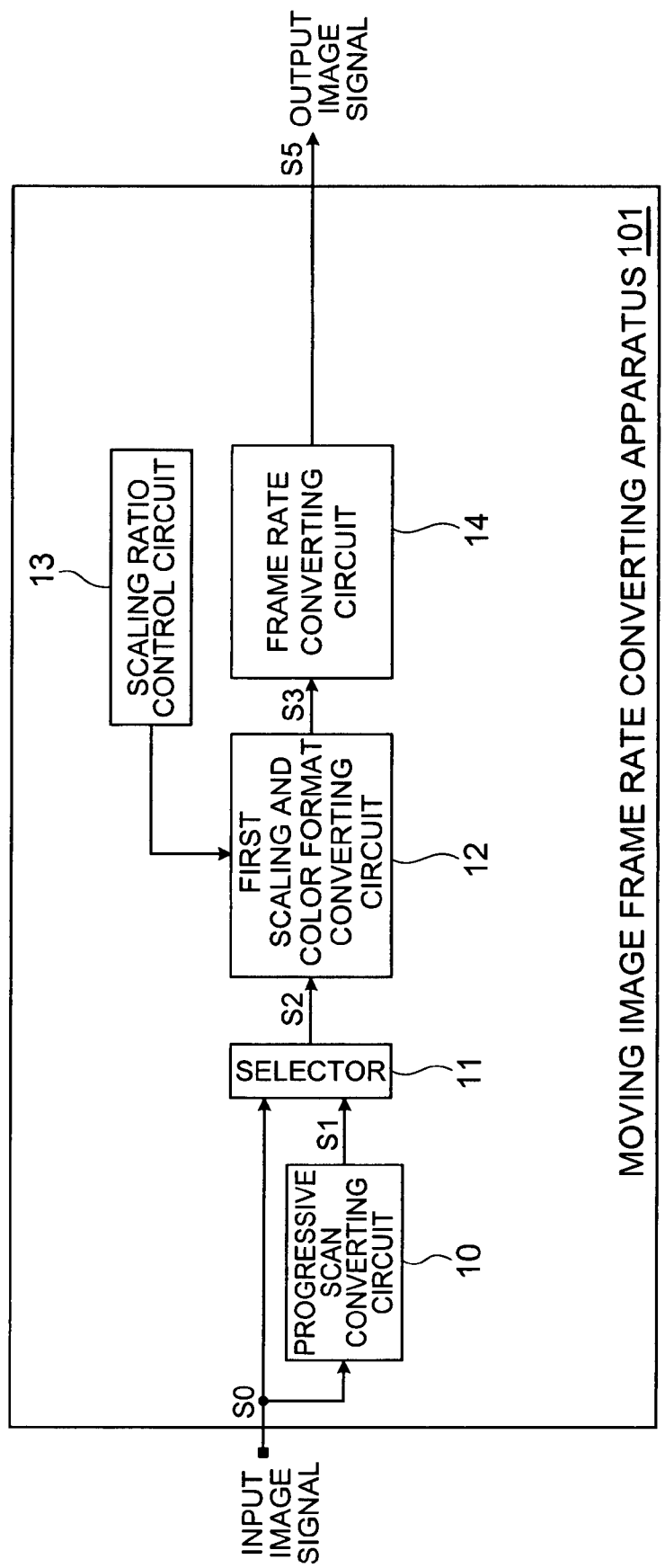
FIG. 5 is an exemplary block diagram showing a configuration of a moving image frame rate converting apparatus associated with the invention in the embodiment.

Here, for comparison, a moving image frame rate converting apparatus 101 associated with the invention will be described. FIG. 5 is a block diagram showing an internal configuration of the moving image frame rate converting apparatus 101. As shown in FIG. 5, in comparison with the moving image frame rate converting apparatus 1, this moving image frame rate converting apparatus 101 is different in having a scaling and color format converting circuit 22 instead of the first scaling and color format converting circuit 12, not having the second scaling circuit 15, and having a scaling ratio control circuit 23 instead of the scaling ratio control circuit 13, and is identical in other points.

Although the scaling and color format converting circuit 22 operates according to a control signal from the scaling ratio control circuit 23, it does not perform only the color format conversion as the first scaling and color format converting circuit 12 does, but performs the scaling and the color format conversion together.

Further, the scaling control circuit 23 outputs to the scaling and color format converting circuit 22 a control signal for instructing to perform scaling and color format conversion.

In this moving image frame rate converting apparatus 101, before frame rate conversion by the frame rate converting circuit 14, scaling and color format conversion is performed by the scaling and color format converting circuit 22. Accordingly, when the image size of the input image signal S0 is to be enlarged, frame rate conversion by the frame rate converting circuit 14 is performed on the pre-conversion image signal S3 whose image size is enlarged by the scaling and color format converting circuit 22. Therefore, an effective search range in which a motion vector can be detected becomes narrow, and it becomes difficult to detect a motion vector.

In this aspect, the moving image frame rate converting apparatus 1 operates as described above to perform the frame rate conversion processing. Specifically, the moving image frame rate converting apparatus 1 is configured such that, when the image size of the input image signal S0 is enlarged or the non-linear scaling is performed and then the frame rate conversion is performed, the first scaling and color format converting circuit 12 performs only the color format conversion before the frame rate conversion, and the enlargement of the image size of the input image signal S0 or the non-linear scaling is performed by the second scaling circuit 15 after the frame rate conversion.

In other words, even when the frame rate converting circuit 14 performs motion vector detection for the frame rate conversion by motion compensation, it results in that this motion vector detection is performed with the input image signal S0 before enlargement of its image size or non-linear scaling being the subject. Therefore, the search range for detecting the motion vector is the same as that before the enlargement of the image size or the non-linear scaling. Therefore, the effective search range in which the motion vector can be detected will not be narrowed, and also detection of the motion vector will not be difficult due to change in shape of an object.

Therefore, the moving image frame rate converting apparatus 1 is configured such that, a motion vector can be detected with high accuracy during the frame rate conversion in the frame rate converting circuit 14, and thereby image quality of an interpolation frame can be increased.

Particularly, when the non-linear scaling is performed, which is often performed in the case of enlarging an image of an aspect ratio 4:3 to an image of 16:9, the enlargement ratio changes from a center portion of the screen to an edge portion of the screen. In this case, when a motion vector is detected after the non-linear scaling is performed, the shape of an object changes between frames, which makes detection of the motion vector difficult. However, the moving image frame rate converting apparatus 1 in the embodiment of the invention is configured such that the motion vector is detected before the shape of an object changes by the non-linear scaling, and thereby the motion vector can be detected with high accuracy, and image quality of an interpolation frame can be increased.

Further, when an input image signal is reduced in image size and then outputted, the motion vector detection is performed after the image size of the input image signal S0 is reduced. Accordingly, the effective search range in which the motion vector can be detected becomes wider than that before the reduction, and thus the motion vector can be detected with high accuracy. Therefore, the moving image frame rate converting apparatus 1 is configured such that the quality of an interpolation frame can be improved also in this aspect.

(Configuration and Operation Contents of the Frame Rate Converting Circuit)

Figure 2:
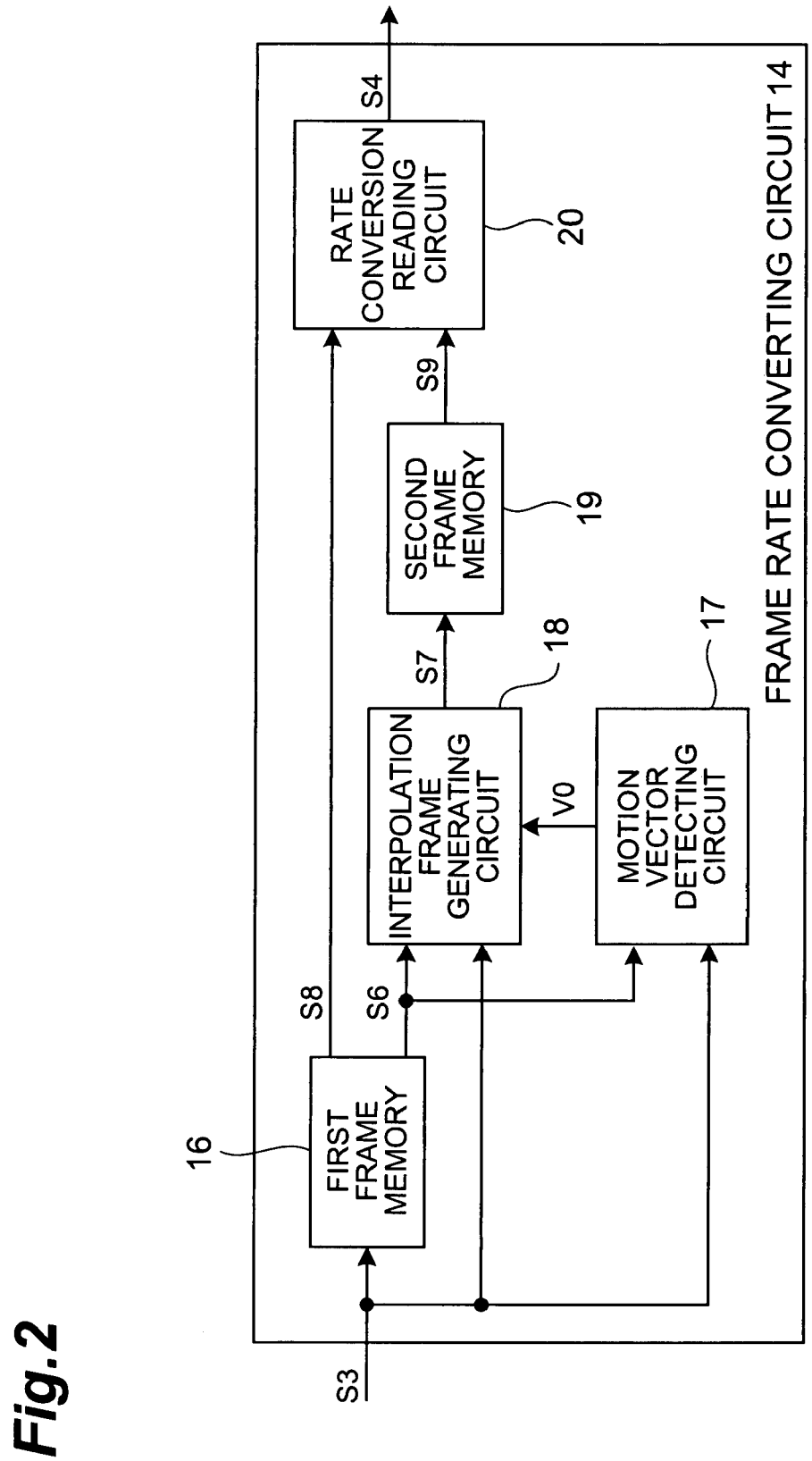
FIG. 2 is an exemplary block diagram showing an example of an internal configuration of the frame rate converting circuit in the embodiment.

The frame rate converting circuit 14 in this embodiment has a configuration as shown in FIG. 2. Specifically, this frame rate converting circuit 14 has a first frame memory 16, a motion vector detecting circuit 17, an interpolation frame generating circuit 18, a second frame memory 19, and a rate conversion reading circuit 20.

In the frame rate converting circuit 14 having such a configuration, a pre-conversion image signal S3 is inputted to the first frame memory 16 and the motion vector detecting circuit 17. Then, the first frame memory 16 stores the pre-conversion image signal S3. Also, the first frame memory 16 inputs a frame delay signal S6, in which the pre-conversion image signal S3 is delayed by one frame period, to the motion vector detecting circuit 17.

Further, the motion vector detecting circuit 17 inputs the pre-conversion image signal S3 and the frame delay signal S6 to detect a motion vector V0 between two frames, and outputs the detected motion vector V0 to the interpolation frame generating circuit 18. Further, the interpolation frame generating circuit 18 moves image positions in previous/subsequent frames by the detected motion vector V0 so as to generate an interpolation frame S7 between the pre-conversion image signal S3 and the frame delay signal S6. The interpolation frame S7 is stored in the second frame memory 19.

Then, the rate conversion reading circuit 20 reads image signals S8, S9 respectively at output frame rates in a chronological order from the first frame memory 16 and the second frame memory 19, and outputs a post-conversion image signal S4. Thus, the frame rate converting circuit 14 performs the frame rate conversion by motion compensation on the pre-conversion image signal S3, and the post-conversion image signal S4 is generated.

With the frame rate converting circuit 14 having the configuration as above, when the input image signal S0 is reduced in image size and outputted, the motion vector detection is performed after the image size of the input image signal S0 is reduced. Consequently, the frame rate converting circuit 14 achieves the operational effect such that memory capacities and/or data transfer amounts of the first frame memory 16 and the second frame memory 19 can be reduced.

Note that the frame rate converting circuit 14 will suffice as long as it has a configuration for performing the frame rate conversion by motion compensation, and the invention can be applied to one that does not have the configuration as above.

(Second Operation Contents of the Moving Image Frame Rate Converting Apparatus)

Next, with reference to the flowchart of FIG. 4, another operation procedure of frame rate conversion processing by the moving image frame rate converting apparatus 1 will be described. The explanation below is provided mainly about differences from the flowchart of FIG. 3, and explanations about common points are omitted or simplified.

When starting the frame rate conversion processing, the moving image frame rate converting apparatus 1 proceeds to block 11, and the scaling ratio control circuit 13 performs an operation as a first judging unit and judges whether the scaling ratio is enlargement (namely, whether the image size of the input image signal S0 is to be enlarged) or not.

At this time, the scaling ratio control circuit 13 executes the processing of block 2 when it is judged that the enlargement of the image size is to be performed similarly to block 1, or otherwise the scaling ratio control circuit 13 executes processing of block 13.

When executing the processing of block 2, the scaling ratio control circuit 13 performs an operation similar to the case of the flowchart of FIG. 3. Then, the processing of block 2 and the processing of block 3 are executed similarly to the case of the flowchart of FIG. 3, and the post-conversion image signal S4 is generated and outputted. Further, when the post-conversion image signal S4 is generated, the processing of block 4 is executed. Here, the scaling ratio control circuit 13 outputs a control signal sg, and the second scaling circuit 15 generates and outputs an output image signal S5 (non-linear scaling is also performed in block 4). When block 4 is finished, the frame rate conversion processing is completed.

Then, when executing the processing of block 13, the scaling ratio control circuit 13 performs an operation as a second judging unit and judges whether non-linear scaling is to be performed or not. Here, the scaling ratio control circuit 13 executes processing of block 14 when it is judged that the non-linear scaling is to be performed, or otherwise executes the processing of block 5. The scaling ratio control circuit 13 performs the processing of block 5 similarly to the flowchart of FIG. 3, and hence blocks 6, 7 are also performed similarly to the flowchart of FIG. 3. When block 7 is completed, the frame rate conversion processing is completed.

Also, when executing the processing of block 14, the scaling ratio control circuit 13 outputs to the first scaling and color format converting circuit 12 a control signal sg for instructing to perform the color format conversion and perform the linear scaling instead of performing the non-linear scaling. Then, the linear scaling and the color format conversion are performed, and the pre-conversion image signal S3 is outputted.

Further, when the pre-conversion image signal S3 is outputted, processing of block 15 is executed similarly to block 3, and the post-conversion image signal S4 is generated and outputted.

Subsequently, when the post-conversion image signal S4 is outputted, processing of block 16 is executed. Here, the scaling ratio control circuit 13 performs an operation as the control unit, and outputs to the second scaling circuit 15 a control signal sg for instructing to perform non-linear scaling on the post-conversion image signal S4. The second scaling circuit 15 performs the non-linear scaling, and generates and outputs the output image signal S5. When block 16 is completed, the frame rate conversion processing is completed.

Also in this manner, in the moving image frame rate converting apparatus 1, a motion vector is detected before the shape of an object changes due to non-linear scaling. Accordingly, the motion vector can be detected with high accuracy, and image quality of an interpolation frame can be increased.

It is noted that in the moving image frame rate converting apparatus 1, the scaling ratio control circuit 13 has functions of the judging unit, the first judging unit to judge whether the image size of an input image signal S0 is to be enlarged or not, and the second judging unit. However, the moving image frame rate converting apparatus 1 may be configured such that one or both of a judgment result of whether the image size of an input image signal S0 is to be enlarged or not and a judgment result of whether non-linear scaling is to be performed or not is/are inputted from outside, and based on the inputted judgment result, the scaling ratio control circuit 13 performs control. In this case, the moving image frame rate converting apparatus 1 does not have the functions of the judging unit, the first judging unit and the second judging unit.

In the above-described first scaling and color format converting circuit 12, the scaling device and the color format converting device are constructed as one block, but the scaling device and the color format converting device may be constructed respectively as independent blocks.

The above explanation is for explaining the embodiments of the invention, and not to limit the apparatus and the method of the invention, and various modification examples thereof can be implemented easily. Also, any apparatus or method constructed by appropriately combining the components, functions, characteristics or method blocks in the respective embodiments are included in the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A moving image frame rate converting apparatus for performing frame rate conversion by motion compensation on an input image signal and generating an output image signal, the apparatus comprising:
   a first image processing device for performing scaling and color format conversion on the input image signal before the frame rate conversion;
   a second image processing device for performing scaling on a post-conversion image signal after the frame rate conversion; and
   a control unit for controlling such that when an image size of the input image signal is to be enlarged, said first image processing device performs the color format conversion without performing the scaling, and said second image processing device performs the scaling so as to generate the output image signal,
   wherein said control unit controls such that when the image size of the input image signal is not to be enlarged, said first image processing device performs the scaling and the color format conversion, and said second image processing device generates the output image signal without performing the scaling.

2. The moving image frame rate converting apparatus according to claim 1, wherein said control unit controls such that when non-linear scaling is to be performed, said first image processing device performs the color format conversion without performing the non-linear scaling, and said second image processing device performs the non-linear scaling so as to generate the output image signal.

3. The moving image frame rate converting apparatus according to claim 1, wherein said control unit controls such that when non-linear scaling is to be performed, said first image processing device performs the color format conversion without performing the non-linear scaling, and said second image processing device performs the non-linear scaling so as to generate the output image signal.

4. The moving image frame rate converting apparatus according to claim 2, wherein said control unit controls such that when non-linear scaling is not to be performed, said first image processing device performs the scaling and the color format conversion, and said second image processing device generates the output image signal without performing the scaling.

5. The moving image frame rate converting apparatus according to claim 1, further comprising a judging unit for judging whether an image size of the input image signal is to be enlarged or not, wherein said control unit controls such that when said judging unit judges that the image size of the input image signal is to be enlarged, said first image processing device performs the color format conversion without performing the scaling, and said second image processing device performs the scaling so as to generate the output image signal.

6. A moving image frame rate converting apparatus for performing frame rate conversion by motion compensation on an input image signal and generating an output image signal, the apparatus comprising:
   a first image processing device for performing scaling and color format conversion on the input image signal before the frame rate conversion;
   a second image processing device for performing scaling on a post-conversion image signal after the frame rate conversion;
   a first judging unit for judging whether an image size of the input image signal is to be enlarged or not; and
   a second judging unit for judging whether non-linear scaling is to be performed or not; and
   a control unit for controlling such that when said first judging unit judges that the image size of the input image signal is to be enlarged, said first image processing device performs the color format conversion without performing the scaling, and said second image processing device performs the scaling so as to generate the output image signal, and when said second judging unit judges that the non-linear scaling is to be performed, said first image processing device performs the linear scaling and the color format conversion, and said second image processing device performs the non-linear scaling so as to generate the output image signal.

7. The moving image frame rate converting apparatus according to claim 6, wherein said control unit controls such that when said first judging unit judges that the image size of the input image signal is not to be enlarged, and said second judging unit judges that the non-linear scaling is not to be performed, said first image processing device performs the scaling and the color format conversion, and said second image processing device generates the output image signal without performing the scaling.

8. The moving image frame rate converting apparatus according to claim 1, further comprising a frame rate converting device for performing frame rate conversion by the motion compensation and outputting the post-conversion image signal, wherein said frame rate converting device comprises: a motion vector detecting device for detecting a motion vector based on a pre-conversion image signal outputted from said first image processing device; and an interpolation frame generating device for generating an interpolation frame based on the motion vector detected by said motion vector detecting device.

9. The moving image frame rate converting apparatus according to claim 6, further comprising a frame rate converting device for performing frame rate conversion by the motion compensation and outputting the post-conversion image signal, wherein said frame rate converting device comprises: a motion vector detecting device for detecting a motion vector based on a pre-conversion image signal outputted from said first image processing device; and an interpolation frame generating device for generating an interpolation frame based on the motion vector detected by said motion vector detecting device.

10. The moving image frame rate converting apparatus according to claim 8, wherein said frame rate converting device further comprises: a first frame memory for storing a pre-conversion image signal outputted from said first image processing device; and a second frame memory for storing the interpolation frame generated by said interpolation frame generating device.

11. A moving image frame rate converting method for performing frame rate conversion by motion compensation on an input image signal and generating an output image signal, the method comprising:
   when an image size of the input image signal is to be enlarged, performing, by a first image processing device for performing scaling and color format conversion on the input image signal before the frame rate conversion, the color format conversion without performing the scaling, and performing, by a second image processing device for performing scaling on a post-conversion image signal after the frame rate conversion, the scaling so as to generate the output image signal, and
   when the image size of the input image signal is not to be enlarged, performing, by said first image processing device, the scaling and the color format conversion, and generating, by said second image processing device, the output image signal without performing the scaling.

12. A moving image frame rate converting apparatus for performing frame rate conversion on an input image signal and generating an output image signal, the apparatus comprising:
   a first image processing device for performing scaling on the input image signal, before the frame rate conversion;
   a second image processing device for performing scaling on a post-conversion image signal after the frame rate conversion; and
   a control unit for controlling such that when an image size of the input image signal is to be enlarged, said first image processing device does not perform the scaling, and said second image processing device performs the scaling so as to generate the output image signal,
   wherein said control unit controls such that when the image size of the input image signal is not to be enlarged, said first image processing device performs the scaling, and said second image processing device generates the output image signal without performing the scaling.

* * * * *